Sept. 5, 1967  J. M. ADAMS ET AL  3,339,268
FRAME FABRICATION METHOD
Filed May 25, 1964  9 Sheets-Sheet 1

INVENTORS
JOHN M. ADAMS
JAMES A. WHITE, JR.

BY John L. Sterling

ATTORNEY

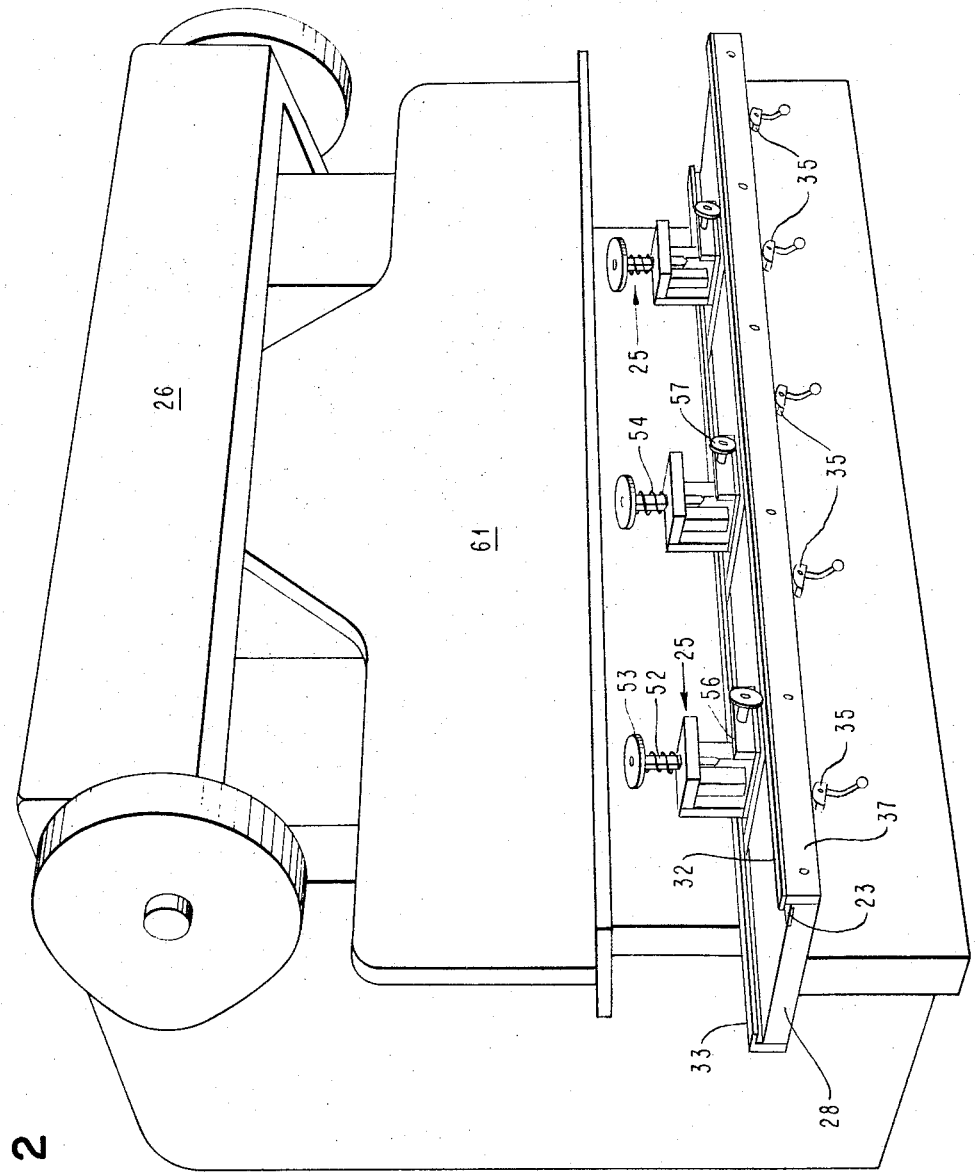

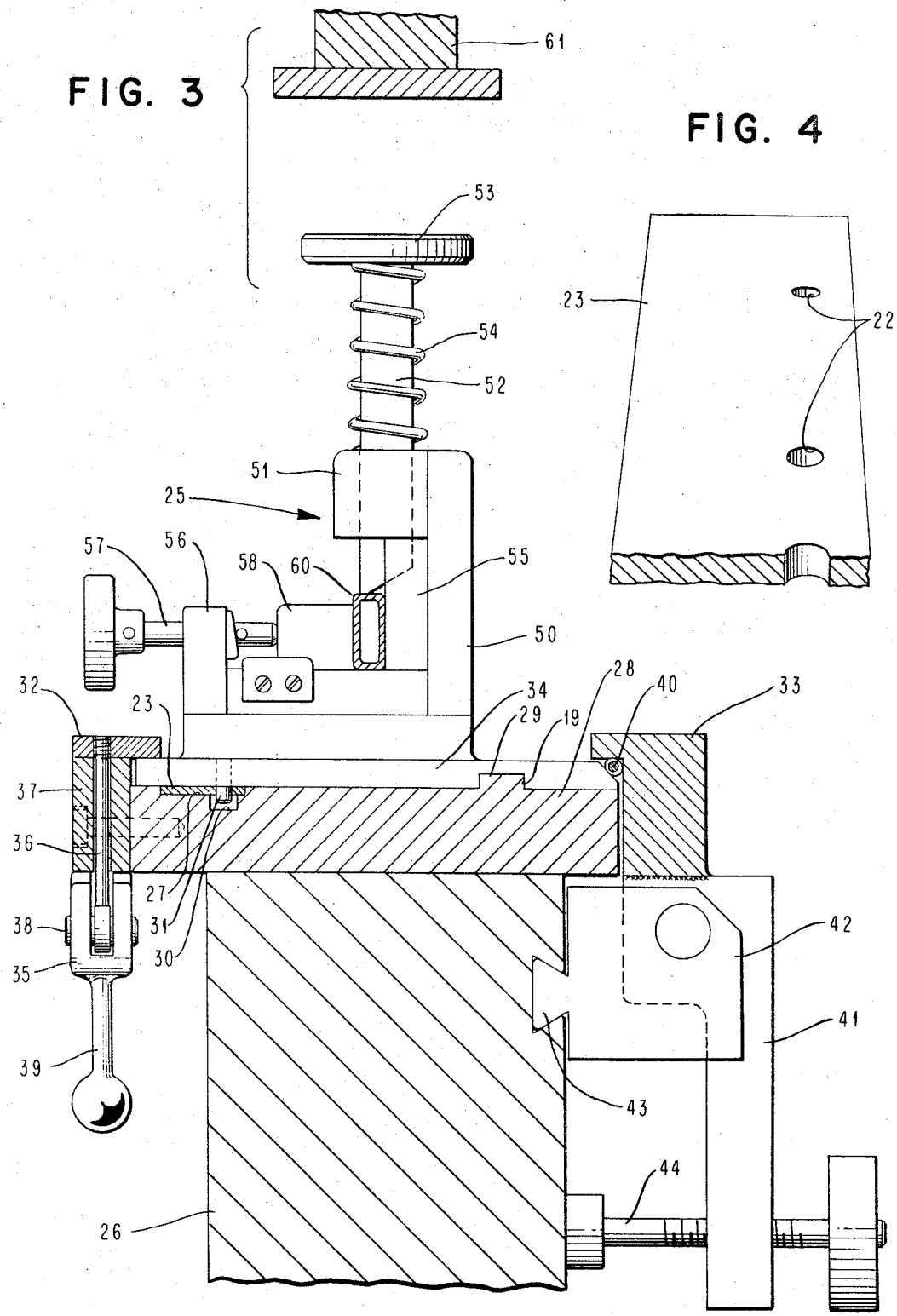

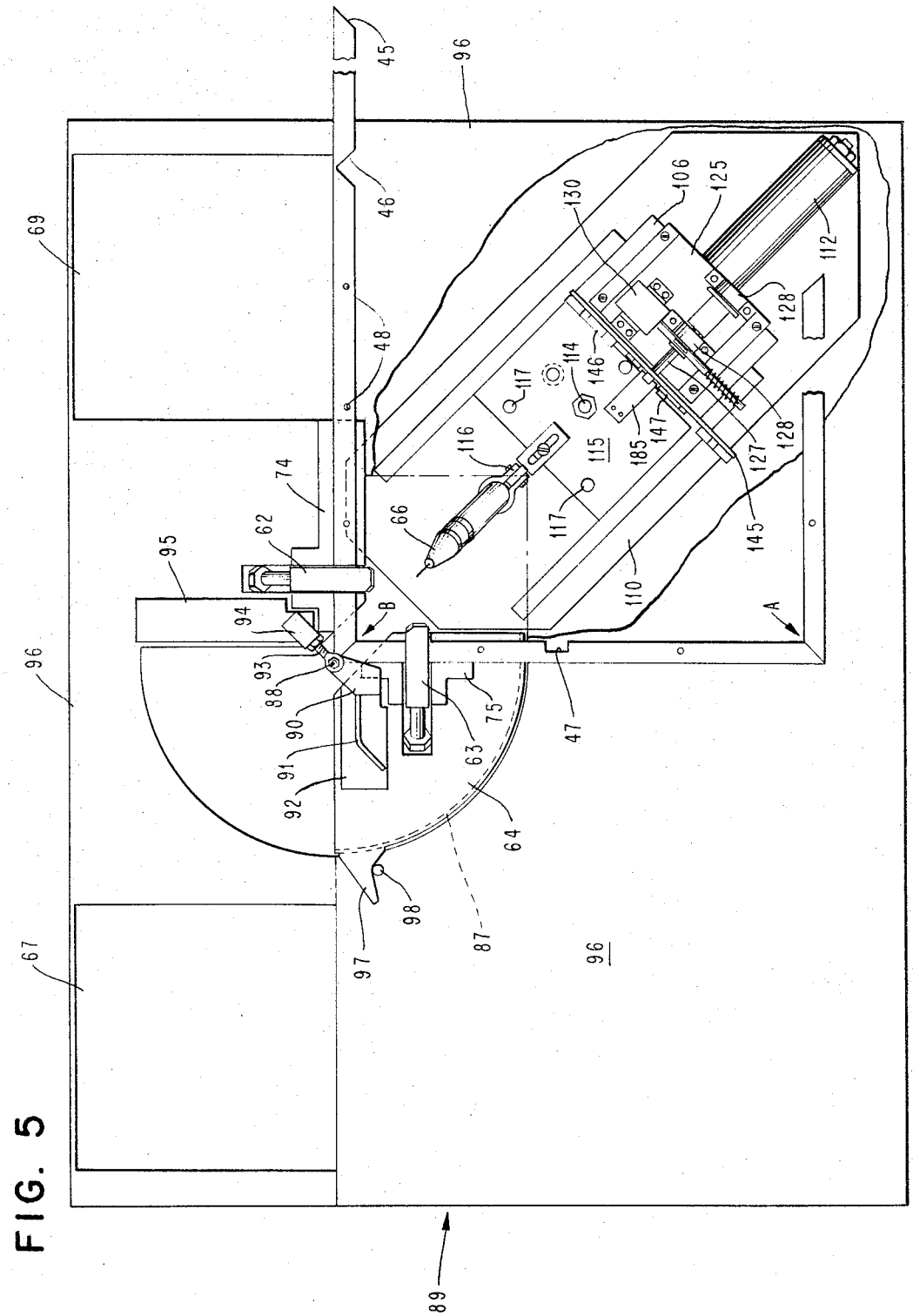

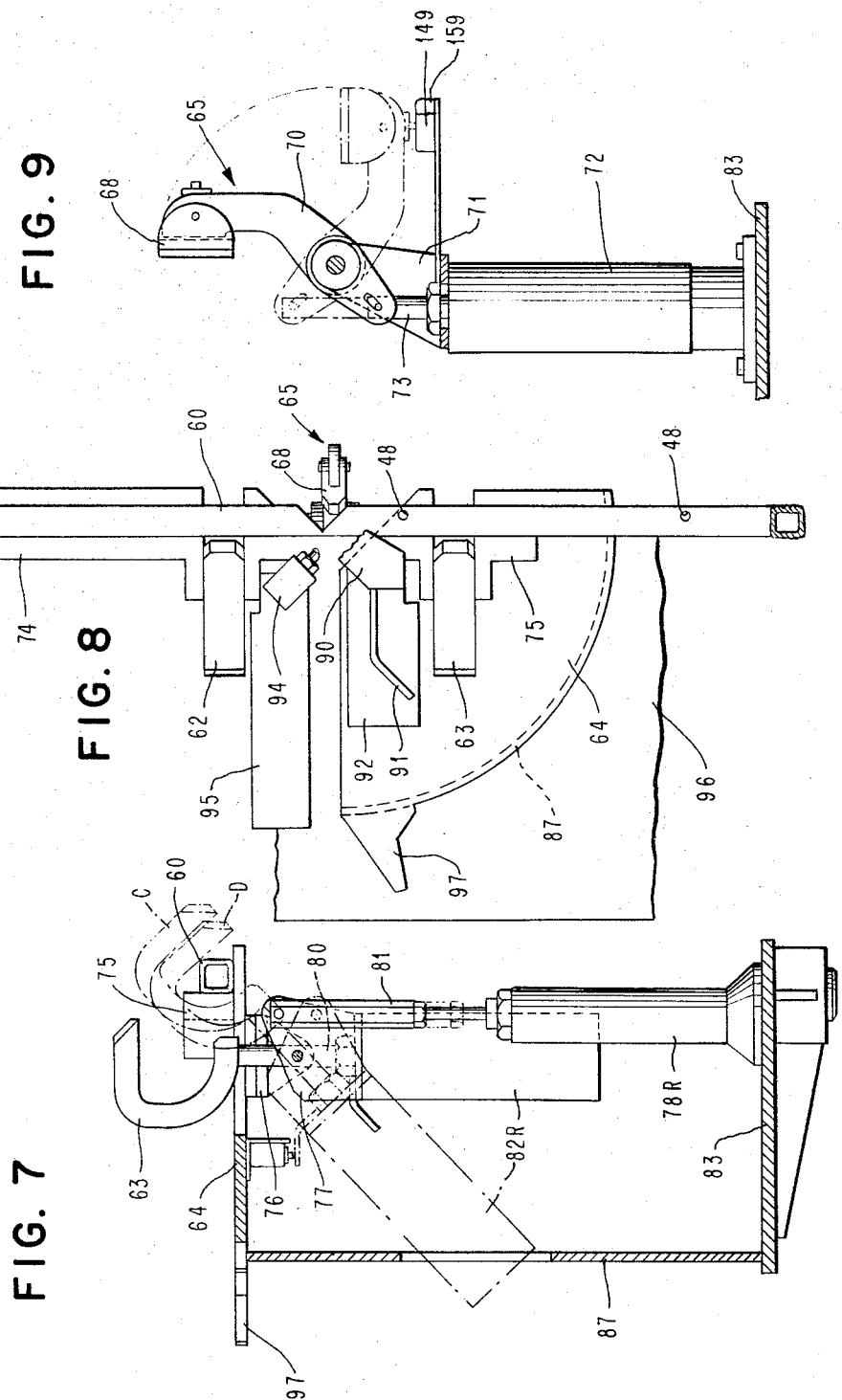

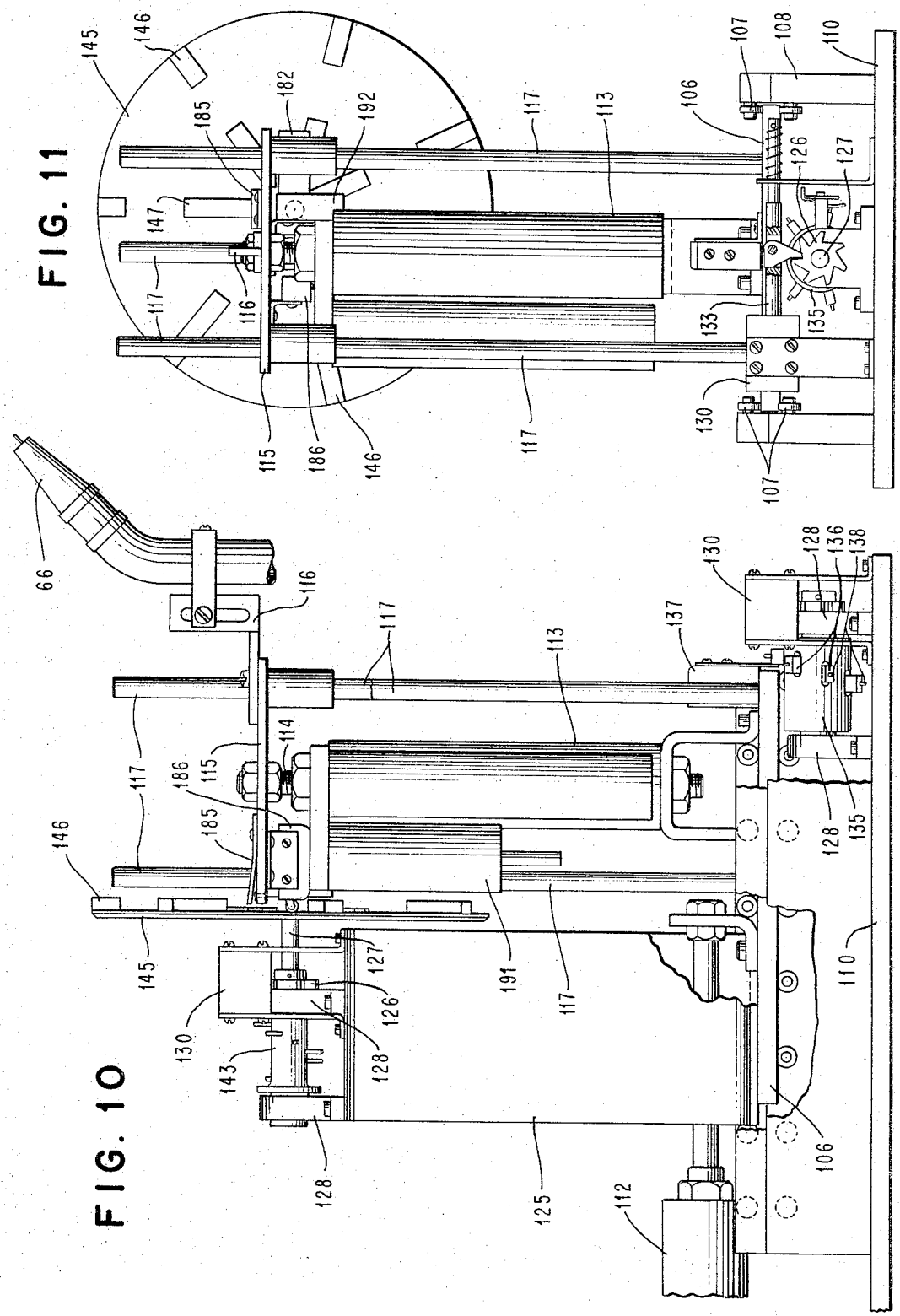

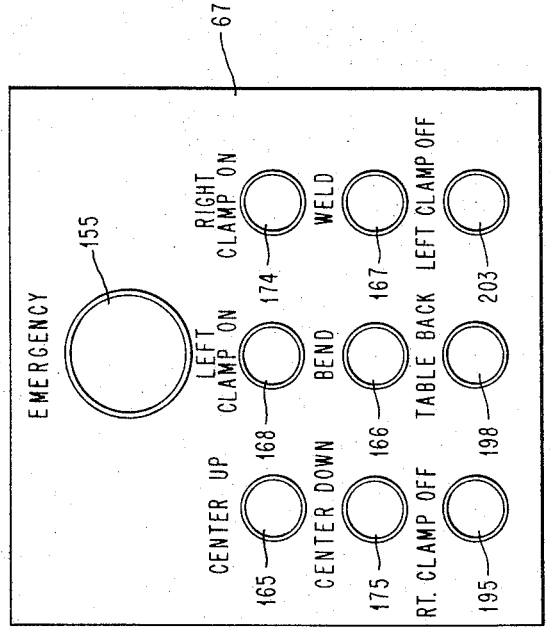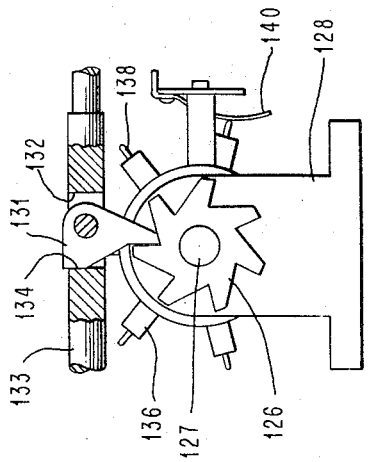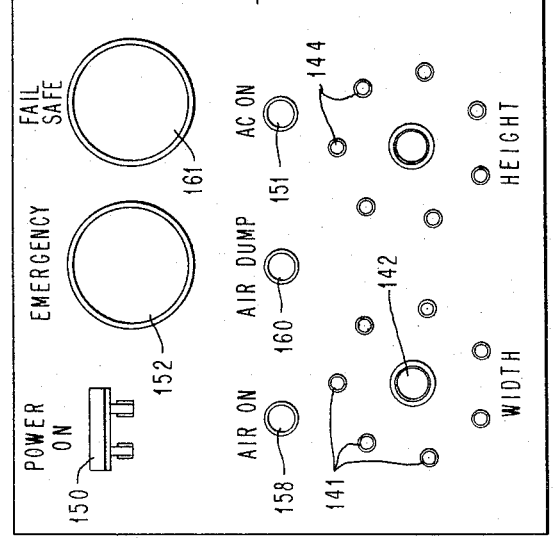

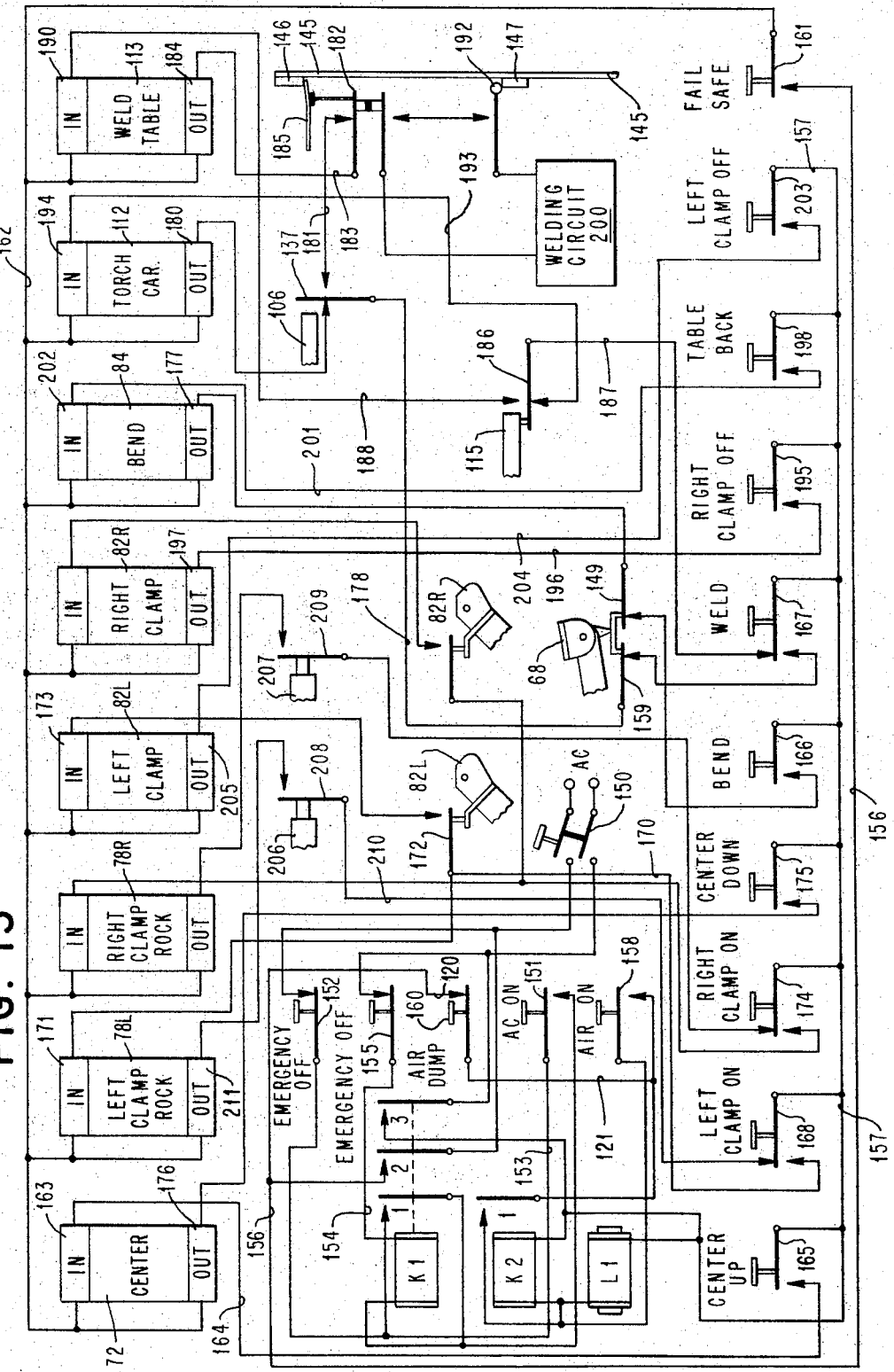

United States Patent Office 3,339,268
Patented Sept. 5, 1967

3,339,268
FRAME FABRICATION METHOD
John M. Adams and James A. White, Jr., Poughkeepsie, N.Y., assignors to International Business Machines Corporation, New York, N.Y., a corporation of New York
Filed May 25, 1964, Ser. No. 369,842
5 Claims. (Cl. 29—475)

This invention relates to a manufacturing process and more particularly to a process for fabricating metal framework.

By present methods, frames of angle iron or tubing are made of individual pieces that have been mitered and then welded, or of lengths that are mitered and bent and then welded. Each of the mitered positions, as well as any holes that are to be pierced, must be located individually resulting in many manual operations that are subject to error. Also, at each bend, if a length of tubing is processed, the allowance for the bend must be figured. These methods are expensive since they are time consuming and are liable to be inaccurate.

It is the principal object of this invention to provide a standardized process of manufacture that is efficient and economical.

Another object is to provide a process for manufacturing a machine frame to a standardized specification.

A further object is to provide a template, the configuration of which is derived by data from a computer which is controlled by the design specifications.

A still further object is to provide a template by which individual tools may be located with relation to a workpiece and a common operator.

Another object is to provide a welder that will locate a piece of pre-notched framing, bend it through a specified angle, and weld the joint formed.

According to one embodiment of the invention, data derived from a dimensioned drawing of the device to be manufactured is entered in punched cards or on tape which is used to control a programmed computer. The computer then provides a printed data sheet listing the dimensions for locating holes in a template. After the holes are drilled, the template is placed in the bed of a power brake to provide points at which individual tools will be located. Each tool has a member in the base thereof which is adapted to be engaged by a particular hole in the template, thus insuring that each operation by a tool will occur at a point dimensioned from a limit stop or zero location. After being located the tools are clamped in position on the machine bed. Angle iron or tubing is then positioned in operative relation with said limit stop and the tools that will notch, pierce, and cut off the tubing to the desired specification with one stroke of the power brake. After notching, the tubing is placed in a bender-welder that will close the notches and weld the inner joint.

The foregoing and other objects, features and advantages of the invention will be apparent from the following more particular description of the preferred embodiments of the invention, as illustrated in the accompanying drawings.

In the drawings:

FIG. 2 is a view in perspective of the front of a power brake showing a set of tools mounted in accordance with a template.

FIG. 3 is an enlarged cross-section through the bed of the power brake showing the method of fastening a tool located by the template.

FIG. 4 is a detail of a template.

FIG. 5 is a plan view of the bender-welder.

FIG. 7 is a view of one of the clamping members of the welder shown in its operating positions.

FIG. 8 is a plan view of the locating members of the welder shown in relation to a notched piece of tubing.

FIG. 9 is a side elevation of the centering member with associated cylinder and bracket.

FIG. 10 is a side elevation of the welder-bender.

FIG. 11 is an end elevation of the welder at the torch table end.

FIG. 12 is an enlarged detail of FIG. 11 showing the drive for a control device.

FIG. 13 is a detail view of the right-hand control console of the welder-bender.

FIG. 14 is a detail view of the left-hand control console of the welder-bender.

FIG. 15 is a schematic of the control circuit and associated pneumatic operating members.

Figure 1:
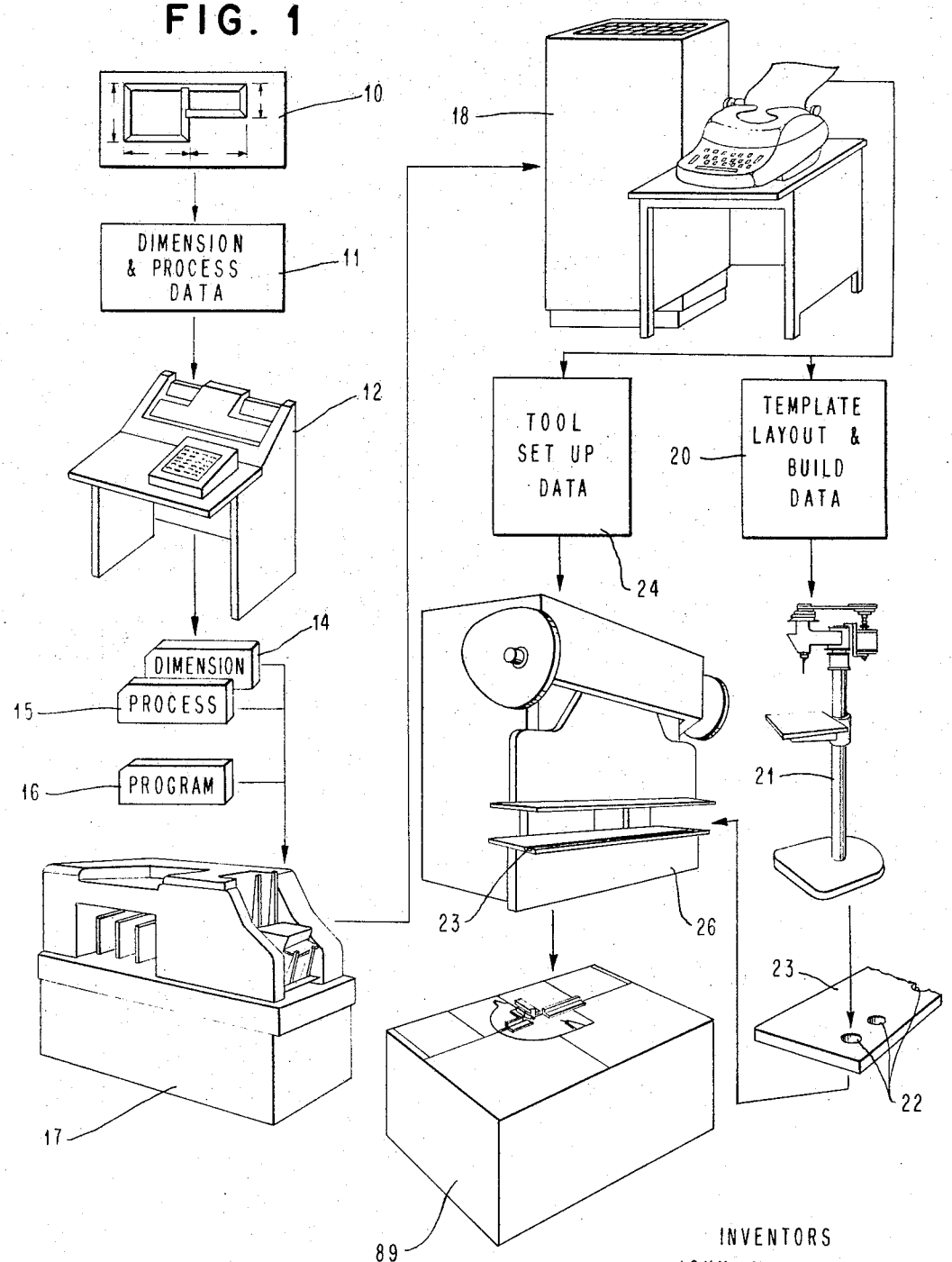
FIG. 1 is a diagram of the flow of the documents and machines needed to determine the layout of the template used in the process.

In setting up the data to be used by the computer (FIG. 1) the dimensions and steps of the process such as notch, pierce or cutoff, are taken from an engineering drawing 10 and entered on a data sheet 11 for the punch operator, who punches the data in punched cards on card punch 12 to form two decks of cards, one 14 containing the dimensional data and the other 15 containing process data. These decks and a deck 16 containing the machine program are placed in a collator 17 that combines the three decks for use in the computer 18. The results of the computation are printed on a template layout sheet 20 that is used at drill press 21 to drill locating holes 22 in a strip of any suitable material such as steel to form a template 23 (FIG. 4). The computer also compiles a record 24 listing the tools 25 needed and the position of each on the power brake 26 (FIG. 2).

In preparing the template all holes are dimensioned from one end of the strip which forms a zero or reference point for mounting the tools in the power brake. The template (FIG. 3) is secured by clamps or any well-known means in a shallow slot 27 formed in the bed 28 of the brake 26. The brake may be any well form having an elongated vertical ram. A second slot 30 extending parallel to and below slot 27 is provided to accommodate the end of a locating pin 31 on each individual tool. Each tool called for one setup tool sheet or record 24 can now be positioned on the bed of the brake by locating its respective pin 31 in a specified hole 22 in the template. It is the usual practice to position a forty-five degree cut-off tool in the first hole from the reference point. This insures that all other notches and pierced holes will fall in the correct relation and also the end of the tubing can be positioned with respect to this first tool so that the end will be mitered with a minimum of waste.

After all of the tools are set up they are secured in place by clamping bars 32 and 33 extending along the front and rear of the bed of the brake. Bar 32 acts vertically on the front edge of the base 34 of each tool to force the tool against the bed 28. A plurality of camming members 35 for operating bar 32 are provided to compensate for any irregularities in the thickness of the individual tool bases. The camming members are secured to the plate 32 by a threaded rod 36 having an eye in the head thereof. The rods are freely mounted in a bar 37 secured to the front of the brake bed. A stub shaft 38 journaled in the eye of a rod 36 rotatably mounts a cam member 35 having a handle 39. Each of the cams when rocked by handle 39 will clamp the front of all of the tools 25 to the brake bed.

The rear of the base plate 34 of each tool is beveled and a clamping bar 33 formed as shown (FIG. 3) acts against a rubber covered rod 40 and the bevel to secure the rear of each tool base to the brake bed. Here again irregularities in the base plate of individual tools is compensated for by use of the rubber covered rod acting between the bar 33 and the bevel on the tool base. Welded at intervals along the bar 33 are L-shaped members 41 each of which is journaled in a trunnion 42 slidably mounted in a groove 43 cut in the base of the brake. A hand screw 44 acts in a tapped hole in the dependent leg of member 41 to rock the bar 33 against the rod and so clamp the base of the tool from the rear.

There are four forms of tools used, all of which act as punches to V-notch, U-notch, cutoff and pierce. All of these tools are well-known in one form or another. In FIG. 5 the workpiece in the bender-welder 89 shows the different cuts; at 45 a forty-five degree cutoff, at 46 a ninety degree notch, at 47 a U-notch, and at 48 pierced holes. Each tool comprises a base 34 on which is mounted an upright 50 carrying a guide 51 for a punch member 52. This member has a head 53, and a spring 54 acting between the head and guide holds the member 52 retracted. A slotted bar 55 secured to the upright acts as a guide for the punch. A cross bar 56 secured to the front of the base has a hand screw 57 acting therein to move a block 58 toward the bar 55 to clamp a piece of tubing 60 under the tool.

After the tools are all positioned, a length of tubing 60 is placed under the punches and the hand screws 57 tightened, clamping the tubing or workpiece in position. The brake is now operated and the ram 61 descends forcing the punches 52 through the tubing simultaneously notching and piercing according to specification.

It is obvious that there are many methods of fastening and locating the tools on the bed of the brake. An alternate method would omit the clamping bars 32 and 33 and provide a plurality of magnetic chucks in the bed. Also the bars 32 and 33 may be operated by any well-known hydraulic means.

Each of the tools, besides being provided with a pin 31 for cooperation with the template, is provided with a groove 19 cut in the base of the tool that cooperatees with a bar or ridge 29 on the top of the brake bed. The pin will locate the tool and the groove, and the bar will not only prevent rotation about the pin, but forward or backward movement of the tool, until the magnetic chucks or, as in the above method, the clamps are operated.

After being notched and pierced, a length of tubing 60 is placed in the bender-welder 89 (FIG. 5). The tubing has been bent and welded at point A and has been bent at point B but not welded. In this plan view the operator is standing with his back to the top of the page. This liberty with convention has been taken since the working parts of the welder can be best shown looking from the rear of the machine.

Figure 6:
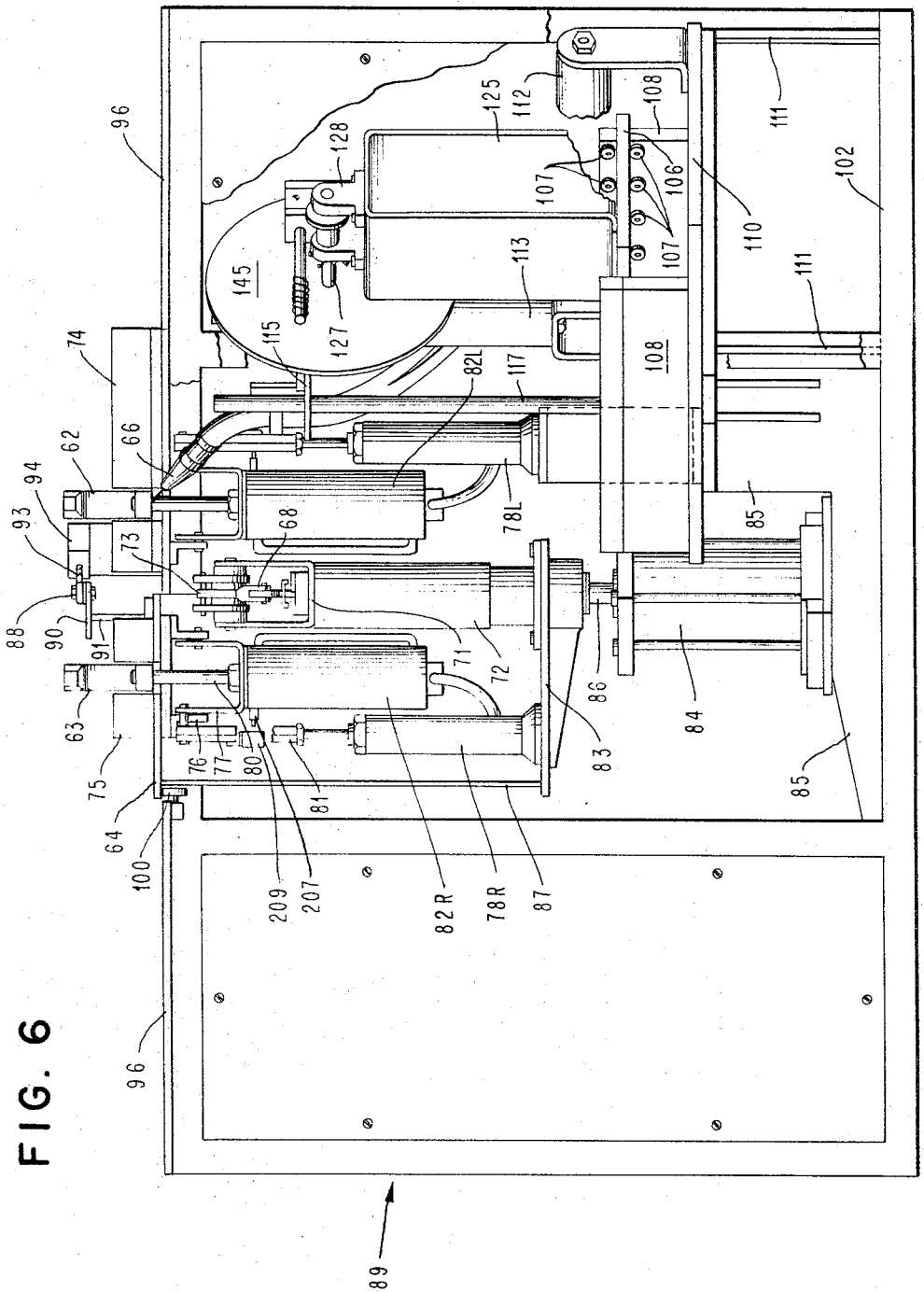
FIG. 6 is a rear elevation of the bender-welder.

The principal parts of the bender-welder 89 are a fixed clamp 62 and a clamp 63 carried on a rotatable table 64, a centering member 65 (FIGS. 8 and 9) and a welding electrode or gun 66. All are moved to and from their operative positions by fluid operated means that are electrically controlled by buttons in the consoles 67 and 69. The preferred form of operating means is a pneumatic cylinder, the valves of which are operated by electro-mechanical means similar to that shown and described in U.S. patent to Goldring 2,976,852. In the drawing, all piping has been omitted for the sake of clarity. In FIG. 8 both clamps 62 and 63 are shown in normal open position and a length of tubing is in approximately correct position for bending. Before closing the clamps an aligning or centering member 65 is raised from the dot and dash position of FIG. 9 to the full line position. In approaching the full raised position, (FIG. 8) the wedge shaped head 68 of the centering member will engage a side of the notch 46 and further movement of the head will slide the tube toward the bottom of the figure until the head engages both sides of the notch. The head 68 is carried on an arm 70, pivoted in a bracket 71, secured to the top of an operating cylinder 72, the plunger 73 of which is secured to the free end of the arm 70. The cylinder 72 is secured by its base to a plate 83. The action of cylinder 72 is controlled by the CENTER UP button on the console 67 as will be described later. With the centering member holding the tube aligned, buttons on the console will cause clamps 62 and 63 to force the tube 60 against blocks 74 and 75. Since both clamps operate in the same manner only one will be described in detail. Secured to the underside of the arcuate table 64 (FIG. 6) are two triangular brackets 76 in which is pivotally mounted a U-shaped bracket 77 that is secured to and supports a cylinder 82R. The cylinders 82 have been designated 82L and R to indicate control of the left and right clamps 62 and 63 respectively. The piston 80 of this cylinder is secured to the right clamp 63. The ear (FIG.7) of the bracket 77 is pinned to a link 81 secured to the piston of a cylinder 78R that is secured by its base to plate 83. In operation, the cylinder 78R is operated withdrawing its piston to rock cylinder 82R and clamp 63 to position C shown in dot-dash lines. Cylinder 82R is now operated in the reverse direction withdrawing its piston to move the clamp to position D where it will grip the tubing 60 and hold it against table 64 and block 75. The clamp is so constructed and operated that it will firmly hold any size and shape of tubing within a specified range of dimensions. The construction of clamp 62 and its associated air cylinders is identical to that of clamp 63 and they both operate in the same manner.

Clamp 62 is next closed in the same manner by operating cylinders 78L and 82L. With the workpiece firmly held, that portion held by right-hand clamp 63 can now be bent at right angles to that portion held by clamp 62. A hydraulic motor 84 (FIG. 6) secured to base 85 has the plate 83 secured to its shaft 86. It will be recalled that the plate 83 has the cylinders 72, 78R and 82R mounted thereon for operating the centering head 68 and the right-hand clamp 63. When the motor 84 is operated, the plates 64 and 83 that are secured together by an arcuate plate or shell 87, will rotate with shaft 86 about a pivot 88. The pivot (FIGS. 5, 6 and 8) is carried in a plate 90 secured to an upstanding plate 91, secured to a base 92, that is in turn secured to the plate 64. The pivot rotates in an eye bolt 93 adjustably secured in a block 94 fastened to a block 95 that is in turn fastened to a plate 96 that forms the upper deck of the bender. The plate 64 rotates in a hole cut in the deck 96 and in rotating bends the tube 60 until a finger 97 on the plate contacts a pin 98 extending upward out of the deck. Rollers 100 (FIG. 6) mounted around the hole cut in the plate 96 support the outer edge of plate 64.

With the tube bent as seen in FIG. 5 the weld button 167 is operated. This causes the gun 66 to be moved toward the angle in the tubing, raised and then lowered. During the raising and lowering the inner line of the angle at point B will be welded as will be explained later. The gun 66 (FIGS. 6 and 10) is carried on a carriage or platform 106 that rides between rollers 107 mounted on the inner faces of upstanding plates 108 secured to a stationary table 110 set on legs 111 that are secured to the base 102 of the machine. A cylinder 112 mounted horizontally on the table 110 drives the carriage 106 back and forth. As shown in FIG. 5 the carriage is fully retracted and in FIG. 10 is fully extended. A cylinder 113 mounted vertically by its base to the carriage has its piston 114 secured to a platform 115 to which the gun 66 is fastened by a bracket 116. The platform moves up and down on three guide rods 117.

Mounted on the carriage 106 is a U-shaped frame 125 on the top of which is secured a device for selectively controlling the travel of the platform 115 and the operation of the gun 66. A similar device is also mounted on the table 110 for selectively controlling the travel of the carriage 106. Since the drive for both devices is the same in construction, similar reference characters will be used for all parts. Each comprises a toothed disc (FIG. 12) or ratchet 126 secured to a shaft 127 journaled in blocks 128. A solenoid 130 drives a pawl 131 for rotating disc 126. The pawl 131 is pivotally mounted in a slot 132 cut in the plunger 133 of the solenoid. A nose 134 on the pawl will prevent its rocking on the IN stroke of the plunger (to the left in FIG. 12) thus causing it to rotate disc 126 and so drive shaft 127 in incremental amounts. On the return stroke the pawl is free to ratchet over the next tooth of the disc.

In the device mounted on the table 110, a drum 135 is secured to its shaft 127. This drum is provided with blocks 136 of insulating material that are positioned in a spiral about the drum. These blocks are so located that they will act as stops to limit the travel of the carriage 106 to locate the gun 66 the correct distance from the tubing to effect a weld in a tubing of a specified width. The block also engages the arm of a micro-switch 137 to prepare a circuit for the return operation of cylinder 112 as will be described later. Pins 138, in the center of blocks 136, make contact with springs 140 to close circuits to light lamp indicators 141 (FIG. 14) on the left hand console. Each lamp is associated with a legend indicating width of tubing. A button 142 is pulsed actuating the solenoid 130 until the lamp is lit opposite the dimension of the tubing being worked on. Thus the operator knows that the gun will be stopped in its forward travel at the correct distance from the tubing to affect a strong weld.

The device mounted on U shaped frame 125 (FIG. 10) has a drum 143 thereon similar to drum 135 except the blocks 136 are omitted. The pins 138 on this drum light lamp indicators 144 on the left hand console 69 (FIG. 14) to indicate the position of a disk 145 secured to shaft 127. This disk has blocks or cams 146 thereon that limit the rise of the platform 115 and control the welding period of gun 66. The lamps 144 are associated with legends indicating the amount of travel of the gun while welding a tube of a certain height. How the cams 146 effect this control will be described later.

A console 67 (FIG. 13) on the right hand side of the welder contains button switches for controlling the operation of the clamps, centering head, welding and bending.

In order to simplify the description of the circuit in FIG. 15 all normally open contacts will be referred to as the n/o contacts and normally closed contacts as n/c contacts.

To operate the welder-bender through a cycle of bending and welding, the main switch 150 is closed connecting AC current to the circuits. The AC ON button 151 closes a circuit from AC through the n/c contact of the EMERGENCY OFF button 152, lead 153 n/o contacts of AC ON button, through the winding of relay K1, lead 154, n/c contacts of a second EMERGENCY OFF button 155, to the other side of AC supply. The buttons 152 and 155 are located in consoles 69 and 67 respectively handy to either hand. N/o contact K1–1 of relay K1 bridges the contacts of the AC ON button holding relay K1 operated after the button is released. No showing of the welder circuit 200 is made as any well-known welder may be used. N/o contacts K1–2 and K1–3 maintain AC on leads 156 and 157, until operation of either EMERGENCY OFF button 152 or 155 is operated releasing relay K1. From this point on leads 156 and 157 will be referred to as AC supply. Control of the compressed air supply is effected by the AIR ON button 158 which when depressed closes a circuit from AC supply through n/o contact K1–2 now closed, through the n/c contact of the AIR DUMP button 160, through the now closed contacts of the AIR ON button, through the winding of relay K2, n/o contact K1–3 now closed, to AC supply operating relay K2.

The operation of relay K2 will complete a circuit through the AIR DUMP button 160 to release all air in the system upon shut down. The circuit is traced from AC, n/o contact K1–2 now closed, lead 120, n/c contact of AIR DUMP button 160, lead 121, n/o contact K2–1 now closed winding of the valve solenoid L–1 to AC lead 157. When the AIR DUMP button 160 is depressed the circuit will be opened releasing solenoid L–1 opening a vent valve in the air supply line.

After a prenotched piece of tubing has been positioned on the table with the first notch roughly aligned, the operator depresses the FAIL SAFE button 161. This button must be depressed during all normal operations of the device. If the CENTER UP button 165 is pressed at the same time, a circuit is closed from AC lead 156, through FAIL SAFE button 161, lead 162, through the electro-mechanical IN valve 163 of the CENTER cylinder 72, lead 164, CENTER UP button 165, to AC lead 157. Operation of cylinder 72 will raise aligner head 68 into the full line position of FIG. 9, where it will engage the notch in the tubing, centering the notch prior to clamping. When the head rises, switches 149 and 159 are opened, the first opening the circuit to the BEND key 166, and the second opening the circuit to the WELD key 167, thus preventing welding or bending during the time the head is raised.

The electromechanical valves associated with the different air cylinders have been designated IN and OUT to indicate the direction of movement of the piston under control of that particular valve.

LEFT CLAMP ON button 168 is now depressed opening the circuit to the OUT valve of the LEFT CLAMP cylinder 82L and closing a circuit from AC lead 157, through the n/o contacts of the button 168, lead 170, to the IN valve 171 of the cylinder 78L, the piston of which will rock the cylinder 82L, as described above, bringing the clamp down to position C of FIG. 7. With the cylinder 82L fully rocked a switch 172 is closed by a bracket on the cylinder 82L, completing a circuit from AC lead 157, n/o contact of LEFT CLAMP button 168 still held closed, n/o contact of switch 172 now closed, to the IN valve 173 of cylinder 82R. This will cause the cylinder 82L to withdraw its piston 80 and clamp 62 will be moved to position D clamping the tubing against block 74.

The RIGHT CLAMP ON button 174 when depressed will close similar circuits to actuate cylinder 78R, and then in turn operate 82R through the same sequence as described above, thus closing the right clamp 63.

The CENTER DOWN button 175 is now operated closing a circuit to the OUT valve 176 of cylinder 72, causing the piston 73 of that cylinder to lower the head 68. This will again close switches 149 and 159 and so reset the bending and welding circuits.

Bending of the tubing 60 is now effected by pressing BEND button 166 which closes a circuit through n/c switch 149, to the OUT valve 177 of air motor 84, which as described above will rotate the plate 64 through ninety degrees, closing the notch in the tubing at point B.

To start the weld operation the WELD button 167 is pressed and held down until carriage 106 carrying the gun 66 stops and platform 115 is fully raised. The depressing of the WELD button opens a circuit to the IN valve of the cylinder 112 preventing its retraction during a welding cycle. Weld button 167 closes a circuit from AC lead 157 n/o contact of button 167, n/c contact of switch 159, lead 178, n/c contact of switch 137 to the OUT valve 180 of cylinder 112. This cylinder will advance the carriage 106 until it is stopped by a block 136 (FIG. 10) on drum 135. Simultaneously the depending arm of the switch 137 upon contact with one of the blocks 136 will open its n/c contact thus opening the circuit to valve 180 stopping the forward movement of the carriage. At the same time the n/o contact of switch 137 closes a circuit through the n/o contact of the WELD key, still held closed, n/c contact 159, lead 178, n/o contact switch 137, now closed, lead 181, n/c contact and upper spring of switch 182, lead 183 to the OUT valve 184 of cylinder 113. This will raise the table 115 carrying the gun 66 up to the welding position. The rise of the table is stopped by leaf spring 185 contacting a cam 146 on disk 145 and since the spring 185 is connected to switch 182 it will open the n/c contact thus opening the circuit to the OUT valve 184 preventing further rise of the platform 115. The switch 182 has two blades, the lower one of which closes an n/o contact to prepare a welding circuit. When the platform 115 starts up a switch 186 transfers a circuit from the n/c contact of the WELD button from the IN 194 valve of cylinder 112 to the IN 190 valve of cylinder 113.

The WELD button 167 is now released, closing its n/c contact. This completes a circuit from AC lead 157, n/c contact of switch 167, lead 187, n/o contact of switch 186, lead 188 to the IN valve 190 of cylinder 113. This will start the platform down slowly under control of a dash pot 191. As the platform travels down the roller ON switch 192 engages a cam 147 on disk 145 closing the n/o contact of switch 192 to complete the welding circuit 200 through the n/o contact and lower spring of switch 182. As the roller leaves the cam 147, the welding circuit is opened and the platform 115 drops back to normal closing the n/c contact of switch 186 completing a circuit from the n/c contact of the WELD button 167, lead 187, n/c contact of switch 186, lead 193 to the IN valve 194 of cylinder 112. This will restore the carriage 106 to normal position.

Operation of the RIGHT CLAMP OFF button 195 closes a circuit over lead 196 to OUT valve 197 of cylinder 82R which will open the right hand clamp 63. With the right hand clamp open the TABLE BACK button 198 is depressed closing a circuit from AC lead 157, n/o contact of button 198, now closed lead 201 to the IN valve 202 of the air motor 84 which will rotate the table 64 back to normal. The tubing can now be released by depressing the LEFT CLAMP OFF button 203. A circuit will then be closed from AC lead 157, n/o contact of button 203, now closed lead 204, OUT valve 205 of cylinder 82L opening clamp 62.

As either of the IN valves for cylinders 78R or 78L is actuated the air actuates a plunger 206 or 207 that will close the n/o contacts of switches 208 or 209. Since both control a similar circuit only one, that for the LEFT CLAMP, will be described. The circuit extends from AC lead 157, n/c contact of LEFT CLAMP ON button 168, lead 210 n/o contact of switch 208 now closed to the OUT valve 211 of cylinder 78L which will rock cylinder 82L back to normal ready for another cycle of operation.

What is claimed is:

1. A frame fabricating method comprising the steps of entering data, obtained from a drawing showing the device to be made, in a control medium; using said control medium to control a computer to provide a set of dimensions from which a locating means can be formed, and a set-up procedure from which a plurality of tools may be positioned on a power brake; forming said locating means; positioning said locating means on said power brake; positioning said tools on said brake in accordance with said locating means and setup procedure; positioning a workpiece in operative relation to said tools; operating said brake to machine said workpiece at points specified by said drawing; removing said workpiece from said brake to a bender-welded wherein said workpiece is bent at the point of machining; and welding said machine points.

2. In a method for fabricating frames, the steps comprising punching cards with data pertaining to dimensions and process, obtained from a drawing showing one of said frames, using said cards in a computer to provide a set of dimensions from which a guide member may be formed and setup procedure from which a plurality of punches may be positioned on a power brake, forming said guide member, positioning said guide member on said power brake, positioning said punches on said brake in accordance with said guide member and said setup procedure, positioning a length of tubing in operative relation to said punches, operating said brake to notch and pierce said tubing at points specified by said drawing, removing said tubing from said brake to a bender-welder wherein said tubing is bent at said notches to form corners and welding said corners along the joint line to form a frame.

3. In a method for fabricating frames, the steps comprising punching cards with data pertaining to dimensions and process, obtained from a drawing showing said frame, using said cards in a programmed computer to provide a set of dimensions from which a template may be formed and a setup procedure from which a plurality of tools may be positioned on a power brake, forming said template, positioning said template on said power brake, positioning said tools on said brake in accordance with said template, positioning a length of tubing in operative relation to said tools, operating said brake to notch and pierce said tubing at points specified by said drawing, removing said tubing from said brake to a bender-welder wherein said tubing is bent at said notches to form corners and welding said corners along the joint line.

4. In a method for fabricating frames, the steps comprising punching cards with data pertaining to dimensions and process, obtained from a drawing showing said frame, using said cards in a programmed computer to provide a set of dimensions from which a template may be formed and a setup procedure from which a plurality of punches may be positioned on a power brake, forming said template, positioning said template on said power brake, positioning said punches on said brake in accordance with said template, positioning a length of tubing in operative relation to said punches, operating said brake to notch and pierce said tubing at points specified by said drawing, removing said tubing from said brake to a bender-welder wherein said tubing is bent at said notches to form corners and welding said corners along the joint line.

5. A frame fabricating method comprising the steps of entering data, obtained from a drawing showing the device to be made, in a control medium; using said control medium to control a computer to provide a set of dimensions from which holes may be located and drilled in a template, and a setup procedure from which a plurality of tools may be positioned on a power brake; forming said template; positioning said template in the bed of said power brake, each of said tools having a pin in the base thereof positioning said tools on said brake with a pin of each tool in a hole in said template; positioning a workpiece in operative relation to said tools; operating said brake to machine said workpiece at points specified by said drawing and controlled by said template; removing said workpiece from said brake to a bender-welder wherein said workpiece is bent at the point of machining; and welding said machined points.

References Cited
UNITED STATES PATENTS

| | | | |
|---|---|---|---|
| 766,748 | 8/1904 | Vauclain | 77—62 |
| 2,613,719 | 10/1952 | Conrad. | |
| 2,677,426 | 5/1954 | Glitsch | 83—619 |
| 2,831,244 | 4/1958 | Adell | 29—476 |
| 3,188,892 | 6/1965 | Brainard | 77—24 |

JOHN F. CAMPBELL, *Primary Examiner.*

L. J. WESTFALL, *Assistant Examiner.*